Nov. 1, 1938.    C. S. SIMMONDS    2,135,152
FRONT WHEEL SUSPENSION
Filed Sept. 27, 1937    2 Sheets-Sheet 1

INVENTOR
C. S. Simmonds
BY
ATTORNEY

Nov. 1, 1938.  C. S. SIMMONDS  2,135,152
FRONT WHEEL SUSPENSION
Filed Sept. 27, 1937   2 Sheets-Sheet 2

INVENTOR
C. S. Simmonds
BY
ATTORNEY

Patented Nov. 1, 1938

2,135,152

UNITED STATES PATENT OFFICE 2,135,152

FRONT WHEEL SUSPENSION

Clyde S. Simmonds, Sacramento, Calif.

Application September 27, 1937, Serial No. 165,908

4 Claims. (Cl. 280—96.2)

This invention relates generally to motor vehicle equipment and in particular is directed to a front wheel suspension unit designed for use in connection with modern high speed motor vehicles.

The principal object of my invention is to provide a front wheel suspension unit for motor vehicles, such unit being of the individual wheel suspension type which eliminates the necessity of using supporting and shock absorbing springs between the axle and vehicle frame.

It is an additional object of my invention to provide a rugged individual wheel suspension unit which will maintain the original and proper wheel adjustment as made at the factory; the unit being capable of withstanding relatively great road shocks without damage, and only requiring infrequent servicing. My improved wheel suspension unit also absorbs road shocks and prevents frame twisting thus materially improving the riding qualities of a vehicle whose front wheels are mounted in connection with such units.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
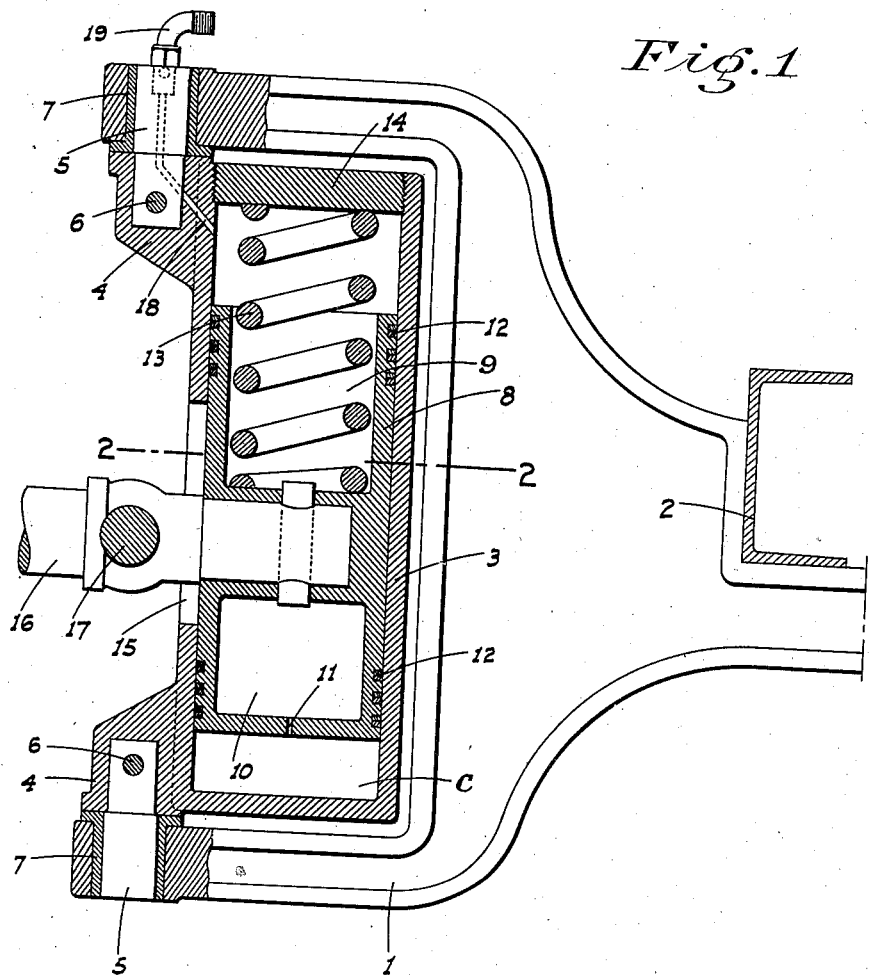
Figure 1 is a rear elevation, mainly in section, of one form of my invention.
Figure 2:
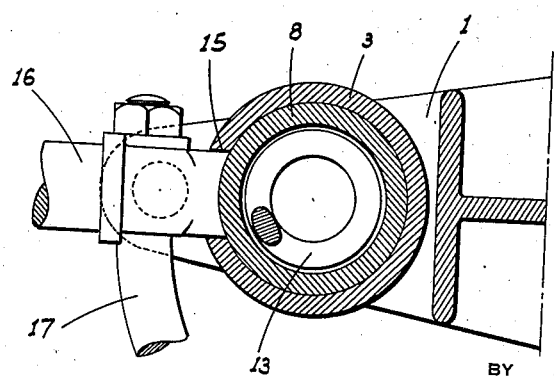
Figure 2 is a cross section on line 2—2 of Fig. 1.

Referring now more particularly to the characters of reference on the drawings, and particularly at present to the form of the invention illustrated in Figs. 1 and 2, each individual wheel suspension unit comprises the following structure:

A vertically disposed yoke 1 is mounted in rigid connection with and projects outwardly from the vehicle frame 2 at substantially right angles thereto. A knuckle assembly including a vertically disposed cylinder 3, having outwardly offset pin supports 4 adjacent each end, is pivoted within the forked portion of the yoke on knuckle pins 5 which engage in said supports. These knuckle pins are removably secured in the supports 4 by suitable means such as cross pins 6, and are journaled in suitable bushings 7 in the yoke.

A piston 8 is disposed in cylinder 3 for reciprocation therein, the piston having an open ended chamber 9 in its upper end and an enclosed chamber 10 formed therein adjacent its other end. A relative small bleed passage 11 is formed between chamber 10 and the exterior of the piston at the lower end. Sealing rings 12 surround the piston at both ends. A heavy duty compression spring 13 is seated at its lower end in chamber 9 and engages at its upper end against a removable head 14 which is threaded into the cylinder at the top. Intermediate its ends and on the outer side thereof the cylinder is formed with a vertical slot 15 of predetermined length. A wheel spindle 16 is fixed in the piston and projects outwardly through slot 15 and at substantially right angles to the piston; the width of the slot 15 being substantially equal to the diameter of the spindle 16. The usual knuckle arm 17 is connected to the spindle.

An air duct 18 extends from the interior of the cylinder through the upper knuckle pin support 4 and into the corresponding knuckle pin 5. A suitable check valve fitting 19 is mounted on the upper end of such pin 5 and in communication with the duct. The fitting 19 is connected to any suitable source of air pressure on the vehicle by means of a flexible conduit (not shown).

In use the cylinder is swung on its pivots in a horizontal plane when the vehicle is steered and when the wheel strikes a bump or the like the piston rises in the cylinder against the compression of spring 13 and the air under pressure in the upper portion of the cylinder, both of which absorb the shock. In some instances, depending on the type of vehicle, the spring or compressed air alone will suffice.

The provision of chamber 10 connected by bleed passage 11 with the chamber C between the lower end of the piston and the bottom of the cylinder, forms, in effect, a rebound shock absorber. Except for bleed passage 11, chamber 10 is entirely enclosed and does not communicate with chamber 9.

Figure 3:
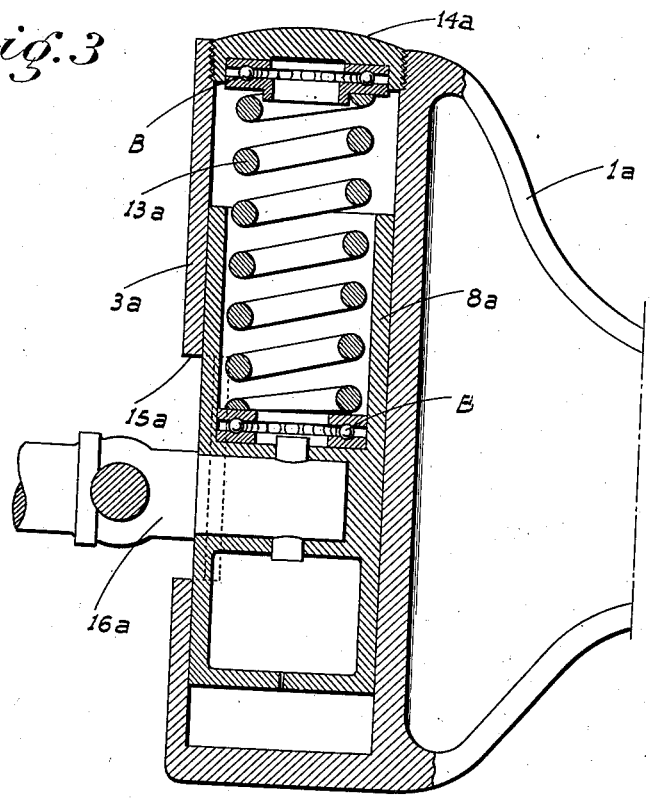
Figure 3 is a rear elevation, mainly in section, of another form of the invention.

In the form of my invention shown in Fig. 3, I embody the same general principles but in this instance the cylinder 3a is not pivoted on but is formed in rigid connection with yoke 1a. The piston 8a is arranged for rotation as well as reciprocation in cylinder 3a and forms the knuckle pin. The slot 15a is of an arcuate extent of approximately 90° and as the piston is rotatable, thrust bearings B are disposed between the ends of compression spring 13a and the piston 8a and head 14a respectively.

This latter form of the invention functions much in the same manner as the first described form with the exception that here the piston itself forms the knuckle pin and rotates with the turning of the wheels, slot 15a being of sufficient extent to permit unrestricted swinging of the wheel spindle 16a. Although only a spring 13a is shown in the latter form of the invention, air under pressure may be used in combination therewith as in the other form, or air may be used alone in certain instances.

Figure 4:
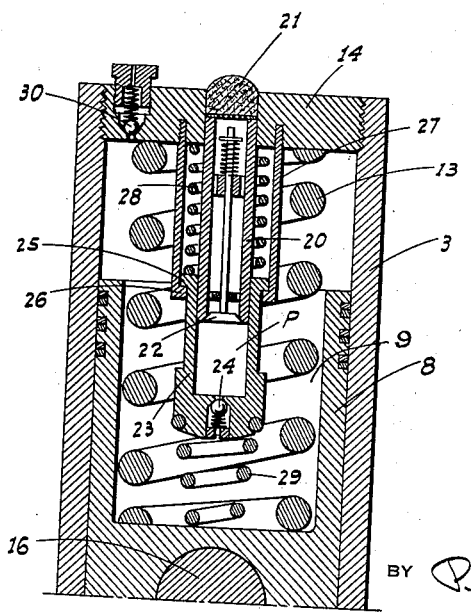
Figure 4 is an enlarged fragmentary sectional elevation of the form of the device shown in Fig. 1 and including an automatic pump assembly mounted therein in unitary connection.

The structure shown in Fig. 4 is a wheel suspension unit cylinder and piston arrangement as in Figs. 1 and 2 but includes an automatic air pump assembly designed to maintain a predetermined air pressure between the upper end of the piston 8 and cylinder head 14. This air pump assembly comprises a tubular piston valve unit 20 fixed at its upper end centrally of the head 14 and depending therefrom into cylinder 3 and inside of spring 13. The upper end of piston valve unit is open to the atmosphere, a filter 21 preventing entry of dirt etc. The lower end of the piston valve unit is normally closed by an inwardly opening, spring seated poppet valve 22 mounted within the tubular unit in the manner shown.

A cylinder 23 is disposed in surrounding and slidable engagement with the piston valve unit, the lower end of the cylinder being closed and having an outwardly or downwardly opening ball check valve 24 disposed in a passage formed through said lower end of the cylinder. The upper end of the cylinder has an outwardly projecting annular flange 25 which engages with an inwardly projecting annular flange 26 on the lower end of a guide sleeve 27 which depends from head 14. A compression spring 28 is disposed between flange 26 and head 14 within sleeve 27 and normally holds the cylinder in lowered position. Another compression spring 29, of greater strength than spring 28, is disposed between the lower end of cylinder 23 and the bottom of chamber 9 in piston 8.

The pump assembly operates as follows: With upward movement of piston 8, cylinder 23 is driven upward and as poppet valve 22 is closed, air is forced from pocket P past the ball check valve 24 into the cylinder 3 and above piston 8. If the piston 8 rises a greater distance than the stroke of cylinder 23, spring 29 is compressed and absorbs such excess movement. Upon downward or return movement of piston 8, ball check valve 24 closes, poppet valve 22 is drawn open by the created suction and air is drawn through filter 21 and tubular piston unit 20 into the pocket P.

To maintain a predetermined air pressure in cylinder 3, an adjustable and outwardly opening release valve 30 is mounted in head 14. The pump assembly, as described, may also be used in connection with the form of the invention shown in Fig. 3.

From the foregoing description it will be readily seen that I have produced such a device as substantially fulfills the objects of the invention as set forth herein.

While this specification sets forth in detail the present and preferred construction of the device, still in practice such deviation from such detail may be resorted to as do not form a departure from the spirit of the invention, as defined by the appended claims.

Having thus described my invention, what I claim as new and useful and desire to secure by Letters Patent is:

1. An individual wheel suspension unit comprising a yoke adapted to be mounted vertically on a vehicle frame and project therefrom, an enclosed cylinder disposed between the forks of the yoke, outwardly offset knuckle pin supports on the outer side of the cylinder adjacent each end, removable knuckle pins pivotally connecting the forks of the yoke to the knuckle pin supports, cushion means between the upper end of the piston and the cylinder head, the cylinder having a vertical slot cut in the outer side thereof, and a wheel spindle fixed on the piston and projecting outwardly through the slot.

2. A device as in claim 1 in which the cylinder and upper knuckle pin support are formed with an air duct leading from the interior of the cylinder, the corresponding knuckle pin having a duct arranged to register with said first named duct, the knuckle pin extending through the yoke fork and having a check valve fitting threaded into its upper end and in communication with said knuckle pin duct.

3. An individual wheel suspension unit comprising a mounting yoke, an enclosed vertical cylinder mounted in connection with the yoke, a piston in the cylinder, said cylinder having a vertical slot cut in one side thereof, a laterally extending wheel spindle fixed on the piston and projecting through the slot, cushion means disposed between the upper end of the piston and cylinder head, and an air pump assembly mounted within the cylinder between one end of the piston and the adjacent end of the cylinder; the assembly having an air intake passage in communication with the atmosphere and being arranged to function with reciprocation of the piston in the cylinder to maintain air under pressure between said one end of the piston and adjacent cylinder end.

4. An individual wheel suspension unit comprising a mounting yoke, an enclosed vertical cylinder mounted in connection with the yoke, a piston in the cylinder, said cylinder having a vertical slot cut in one side thereof, a laterally extending wheel spindle fixed on the piston and projecting through the slot, cushion means disposed between the upper end of the piston and cylinder head, an air pump assembly mounted within the cylinder between one end of the piston and the adjacent end of the cylinder, the assembly having an air intake passage in communication with the atmosphere and being arranged to function with reciprocation of the piston in the cylinder to maintain air under pressure between said one end of the piston and adjacent cylinder end, and a release valve mounted on the cylinder and adapted to retain a predetermined air pressure therein.

CLYDE S. SIMMONDS.